(12) United States Patent
Salter et al.

(10) Patent No.: US 12,311,911 B2
(45) Date of Patent: May 27, 2025

(54) SYSTEMS AND METHODS FOR CONTROLLING ELECTRICAL POWER OUTLETS IN A VEHICLE

(71) Applicant: Ford Global Technologies, LLC, Dearborn, MI (US)

(72) Inventors: Stuart C. Salter, White Lake, MI (US); Brendan Diamond, Grosse Pointe, MI (US); Ryan O'Gorman, Beverly Hills, MI (US); David Celinske, Wolverine Lake, MI (US); Paul Kenneth Dellock, Northville, MI (US); David Brian Glickman, Southfield, MI (US); Vyas Shenoy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 17/935,990

(22) Filed: Sep. 28, 2022

(65) Prior Publication Data

US 2024/0101098 A1 Mar. 28, 2024

(51) Int. Cl.
*B60R 16/03* (2006.01)
*B60W 10/30* (2006.01)
*H04J 4/00* (2006.01)

(52) U.S. Cl.
CPC ............ *B60W 10/30* (2013.01); *B60R 16/03* (2013.01); *H04J 4/00* (2013.01); *H02J 2310/40* (2020.01)

(58) Field of Classification Search
CPC . B60W 10/30; B60R 16/03; H04J 4/00; H02J 2310/40

USPC ......................................................... 307/10.1
See application file for complete search history.

(56) References Cited

U.S. PATENT DOCUMENTS

| 10,328,940 B2 | 6/2019 | Cikalo et al. | |
|---|---|---|---|
| 2015/0112522 A1* | 4/2015 | Liang .................... | B60W 10/08 180/65.265 |
| 2015/0243151 A1* | 8/2015 | Wright .................. | B60W 50/14 340/425.5 |

(Continued)

OTHER PUBLICATIONS

Aaron Bragman, 5 Fun Facts About the 2021 F-150's Onboard Generator, Ford Global Technologies, LLC, Jun. 25, 2020, 1-5.

(Continued)

*Primary Examiner* — Elim Ortiz
*Assistant Examiner* — Xuan Ly
(74) *Attorney, Agent, or Firm* — Frank Lollo; Eversheds Sutherland (US) LLP

(57) ABSTRACT

The disclosure is generally directed to systems and methods for controlling electrical power outlets in a vehicle. An example method executed by a processor of an electrical power outlet controller includes detecting a transitioning of a vehicle to a drive mode and further includes disconnecting, based on the transitioning, electrical power supplied to a first electrical power outlet in the vehicle. The transitioning of the vehicle to the drive mode may be detected based on a transition of a drive selector of the vehicle from a park position to a drive position. In another example method, the processor, detects the vehicle in motion and disconnects electrical power supplied to a second electrical power outlet in the vehicle. The first electrical power outlet and/or the second electrical power outlet are accessible from outside the vehicle, and may, for example, be located outside a cabin area of the vehicle.

20 Claims, 4 Drawing Sheets

(56) References Cited

U.S. PATENT DOCUMENTS

2018/0072252 A1    3/2018  Collins
2021/0053460 A1    2/2021  Oh et al.
2021/0070248 A1*   3/2021  Herhusky ................ B60Q 9/00

OTHER PUBLICATIONS

Jessica Shea Choksey, What is Ford Pro Power OnBoard?, Ford Global Technologies, LLC, Feb. 16, 2021, 1-12.
Joe Wiesenfelder, We Charged a Ford Mustang Mach-E With an F-150, Ford Global Technologies, LLC, Jan. 13, 2022, 1-15.

* cited by examiner

SYSTEMS AND METHODS FOR CONTROLLING ELECTRICAL POWER OUTLETS IN A VEHICLE

BACKGROUND

Some vehicles are equipped with electrical power outlets that can be used for powering various devices such as lights, personal devices, and power tools. It is desirable to address certain issues associated with the use of these electrical power outlets such as, for example, issues pertaining to ease of access, convenience, and preventing unauthorized use of electrical power.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
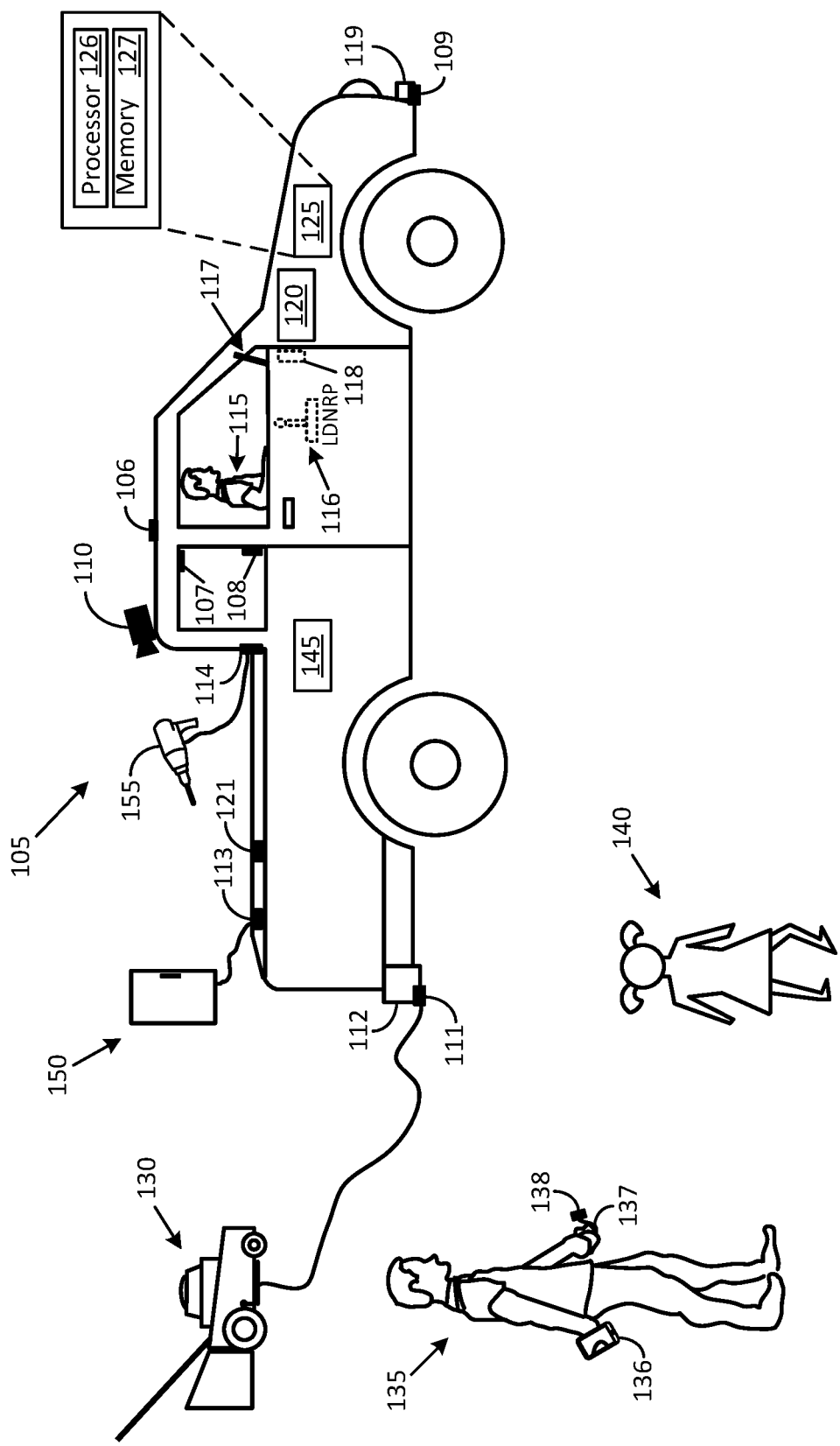
FIG. 1 shows an example vehicle that includes an electrical power outlet controller in accordance with an embodiment of the disclosure.

In terms of a general overview, embodiments described in this disclosure are generally directed to systems and methods for controlling electrical power outlets in a vehicle. An example method executed by a processor of an electrical power outlet controller of the vehicle may include detecting a transitioning of a vehicle to a drive mode and further includes disconnecting, based on the transitioning, electrical power supplied to a first electrical power outlet in the vehicle. The transitioning of the vehicle to the drive mode may be detected based on a transition of a drive selector of the vehicle from a park position to a drive position. In another example method, the processor, detects the vehicle in motion and disconnects electrical power supplied to a second electrical power outlet in the vehicle. The first electrical power outlet and/or the second electrical power outlet are accessible from outside the vehicle. In an example implementation, the vehicle is a truck and at least one of the first electrical power outlet or the second electrical power outlet may be located at various parts of the vehicle such as, for example, a bumper, a grille, a tailgate, a roof, a chassis, or a body panel.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "information" as used herein pertains to any of various forms of data that can be processed by a processor (digital data, digital images, detector signals, etc.). The word "image" as used herein encompasses one or more images in one or more forms. Thus, for example, a description herein of an action associated with an "image" must be understood to indicate an action performed upon a single image in some scenarios and upon multiple images in some other scenarios. The multiple images can be included in various forms such as, for example, in the form of a video clip, and/or in the form of real-time video. The word "detector" as used herein refers to any device than may be used to obtain information about an object, to detect the presence of an object, and/or to detect actions performed by individuals. The word "object" and the word "item" are used in this disclosure in an interchangeable manner. The word "vehicle" as used in this disclosure can pertain to any one of various types of vehicles such as cars, vans, sports utility vehicles, trucks, electric vehicles, gasoline vehicles, and hybrid vehicles.

It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 shows a vehicle 105 that includes an electrical power outlet controller system 125 in accordance with an embodiment of the disclosure. The vehicle 105 may further include components such as, for example, a vehicle computer 120, a camera 110, an infotainment system 117, and an electrical power source 145. These components may be communicatively coupled to the electrical power outlet controller system 125 via a wired communication system and/or a wireless communication system. The vehicle 105 may further include one or more electrical power outlets that are configured to offer access to electrical power provided by the electrical power source 145. The electrical power source 145 may be controlled by the electrical power outlet controller system 125 in accordance with the disclosure.

In the illustrated example, the vehicle 105 is a truck containing a cargo bed on which items can be placed and the description herein pertains to various systems and methods of operation associated with the truck. However, it must be understood that the systems and methods of operation described herein are equally applicable to various other types of vehicles (sedan, van, sports utility vehicle, forklift, etc.). Thus, for example, a description pertaining to characteristics and operations of an electrical power outlet of the truck that is illustrated in FIG. 1 is equally applicable to an electrical power outlet of a van or a sedan, for example.

The vehicle computer 120 may perform various functions of the vehicle 105, such as, for example, controlling engine operations (fuel injection, speed control, emissions control, braking, etc.), managing climate controls (air conditioning, heating etc.), activating airbags, and issuing notifications (check engine light, bulb failure, low tire pressure, etc.). The vehicle computer 120 may also provide various types of information to the electrical power outlet controller system 125, such as, for example, information pertaining to operations associated with the vehicle 105 (speed, movement status, parked status, etc.).

In the illustrated implementation, the camera 110 is an example device that can be used to provide information to the electrical power outlet controller system 125 in the form of images. In other implementations, additional cameras and/or other types of devices may be used to provide information to the electrical power outlet controller system 125. The images provided by the camera 110 may be evaluated by the electrical power outlet controller system 125 for various purposes. In an example scenario, the electrical power outlet controller system 125 may evaluate one or more images provided by the camera 110 to detect an individual 135 who may be moving towards the vehicle and/or to detect a child 140 who is in the vicinity of the vehicle 105. The electrical power outlet controller system 125 may then execute various actions upon one or more electrical power outlets provided in the vehicle 105.

The example electrical power outlets provided in the vehicle 105 include a first set of electrical power outlets that may include an electrical power outlet 107, an electrical power outlet 108, and an electrical power outlet 118 that are located in a cabin area of the vehicle 105. The vehicle 105 further includes a second set of electrical power outlets that may include an electrical power outlet 109, an electrical power outlet 106, an electrical power outlet 114, an electrical power outlet 113, an electrical power outlet 121, and an electrical power outlet 111 that are located outside the cabin area. The electrical power outlets may have various form factors and characteristics (two-hole socket, three-hole socket, US-type layout, European-style layout, etc.) and may be mounted upon various parts of the vehicle 105 such as, for example, a bumper, a grille, a tailgate, a roof, a chassis, or a body panel.

In the illustrated example, the electrical power outlet 109 is located underneath a front bumper 119 of the vehicle 105, the electrical power outlet 106 is located on the roof of the vehicle 105, the electrical power outlet 114 is located on a body panel behind a cabin wall of the vehicle 105, the electrical power outlet 113 and the electrical power outlet 121 are located on a side panel of the cargo bed of the vehicle 105, and the electrical power outlet 111 is located underneath a rear bumper 112 of the vehicle 105.

The electrical power source 145 can include any of various types of components that produce one or more of various types of voltages such as, for example, 5V DC, 12V DC, 110V AC, and 220V AC. In an example implementation, the electrical power source 145 can produce 5V DC that may be provided via the electrical power outlet 118 for use by an occupant of the vehicle 105 (a driver 115, for example). The electrical power outlet 118 may be provided in the form of a USB socket located on an instrument console of the vehicle 105. In another example implementation, the electrical power source 145 can produce 12V DC that may be provided for use by the occupant of the vehicle 105 via the electrical power outlet 118, which may be provided in the form of a cigarette lighter socket, for example. Similar voltages, or other voltages, may be provided via other electrical power outlets in the cabin of the vehicle 105 and outside the cabin of the vehicle 105.

In at least some cases, the electrical power outlets provided outside the cabin of the vehicle 105 may be configured for some types of use that may be similar to those that are applicable to the electrical power outlets in the cabin of the vehicle 105. For example, the electrical power outlet 121 may be configured for charging a personal device such as, for example, a personal device 136 carried by the individual 135. The personal device 136 can be any of various devices such as, for example, a smartphone, a smartwatch, or a portable music system. The individual 135 may also carry a charging cable 137 having a plug 138 (a USB plug, for example) that is compatible with the electrical power outlet 121 (a USB socket, for example).

In some other cases, the electrical power outlets provided outside the cabin of the vehicle 105 may be configured for some types of use that may be different from those applicable to the electrical power outlets inside the cabin of the vehicle 105. For example, in one implementation, the electrical power outlet 111 located underneath the rear bumper 112 of the vehicle 105 may be a 3-hole electrical socket that supplies 110V AC voltage for operating a component such as a lawn mower 130 and the electrical power outlet 118 located in the cabin area of the vehicle 105 can be a USB connector that allows charging of a personal device 136 (a smartphone, for example). The 110V AC power may also be additionally supplied via other electrical power outlets for operating various other types of items such as, for example, a portable refrigerator 150 that is shown plugged into the electrical power outlet 113 and a hand drill 155 that is shown plugged into the electrical power outlet 114.

Some of the items that are plugged into the electrical power outlets of the vehicle 105 are portable and may be transported in the vehicle 105 while plugged into an electrical power outlet of the vehicle 105. One example of such an item is the hand drill 155 that is plugged into the electrical power outlet 114. However, it may be undesirable to transport some other items while plugged into an electrical power outlet of the vehicle 105. One example of such an item is the lawn mower 130 that is plugged into the electrical power outlet 111.

Accordingly, the electrical power outlet controller system 125 may be configured to detect and address an example scenario where the driver 115 may be unaware (or may have overlooked) the lawn mower 130 (for example) that is plugged into the electrical power outlet 111 and begins to drive the vehicle 105. The electrical power outlet controller system 125 detects the action taken by the driver 115 and disconnects electrical power supplied to the electrical power outlet 111.

More particularly, a processor 126 of the electrical power outlet controller system 125 is configured to access a memory 127 and execute computer-executable instructions stored in the memory 127 to perform various operations in accordance with the disclosure such as, for example, disconnecting electrical power supplied to the electrical power outlet 111 upon detecting an action taken by the driver 115 and/or upon detecting an operation of a component of the vehicle 105.

In an example implementation, the processor 126 detects a transition of the vehicle 105 from a park mode to a drive mode by monitoring a condition of a drive selector 116 in the vehicle 105. In an example scenario, the processor 126 detects the drive selector 116 being changed from a park position ("P") to a position where the vehicle 105 can be moved such as a low gear drive position ("L"), a forward drive position ("D"), a neutral position ("N"), or a reverse drive position ("R").

In another example implementation, the processor 126 detects a transitioning of the vehicle 105 from a parked condition to a moving condition based on evaluating a signal received from the vehicle computer 120 and/or components such as a movement detector (not shown) or a speedometer (not shown).

In another example implementation, the processor 126 detects a transitioning of the vehicle 105 from a parked condition to a moving condition based on evaluating one or more images provided by the camera 110. The one or more images may be provided in the form of a video-clip produced by the camera 110 in real time.

In another example implementation, the processor 126 may disconnect electrical power supplied to the electrical power outlet 111 (and/or to other electrical power outlets in the vehicle 105) based on detecting a moving condition of the vehicle 105. The disconnecting operation may be carried out by conveying a control signal to a component such as, for example, a relay, a circuit breaker, or a switch that is provided on a power line. In some scenarios, the processor 126 may further ensure that no other unpowered electrical power outlets located outside the cabin of the vehicle 105 are provided electrical power when the vehicle 105 is moving.

However, in an example implementation, the processor 126 may enable powering up of one or more electrical power outlets, or retaining, one or more electrical power outlets in a powered-up state when the vehicle is moving. This action may be carried out for various reasons. For example, the processor 126 may enable powering up an electrical power outlet (or retaining the electrical power outlet in a powered-up state) in response to an authorization command received from an individual such as, for example, the driver 115. The authorization command may be conveyed to the electrical power outlet controller system 125 in various ways such as, for example, via a graphical user interface (GUI) of the infotainment system 117 or via a personal device (not shown) carried by the driver 115.

In another example implementation, the processor 126 may determine that it is permissible for a device (such as, for example, the hand drill 155 that is connected to the electrical power outlet 114) to be provided electrical power when the vehicle 105 is in motion. In this case, the processor 126 may communicate with the vehicle computer 120 to limit a speed of movement of the vehicle 105 to a threshold speed. The threshold speed may be determined on the basis of various factors such as, for example, a comfort factor, and/or a personal preference.

In another example implementation, the processor 126 may, for various reasons, evaluate images provided by the camera 110 to the electrical power outlet controller system 125 when the vehicle 105 is in a parked condition. In an example scenario, the processor 126 may evaluate the images, such as with facial recognition or other computer vision techniques, and detect the individual 135 moving towards the vehicle 105 and may also, in some cases, determine an identity of the individual 135. The processor 126 may then authorize the use of some (or all) electrical power outlets by the individual 135, based on factors such as, for example, the individual 135 being an authorized user of the electrical power outlets of the vehicle 105, an age of the individual 135, and/or an identity of the individual 135.

In another example scenario, the processor 126 may evaluate the images provided by the camera 110 and detect a child 140 near the vehicle 105. In this scenario, the processor 126 may disable some (or all) electrical power outlets of the vehicle 105.

Figure 2:
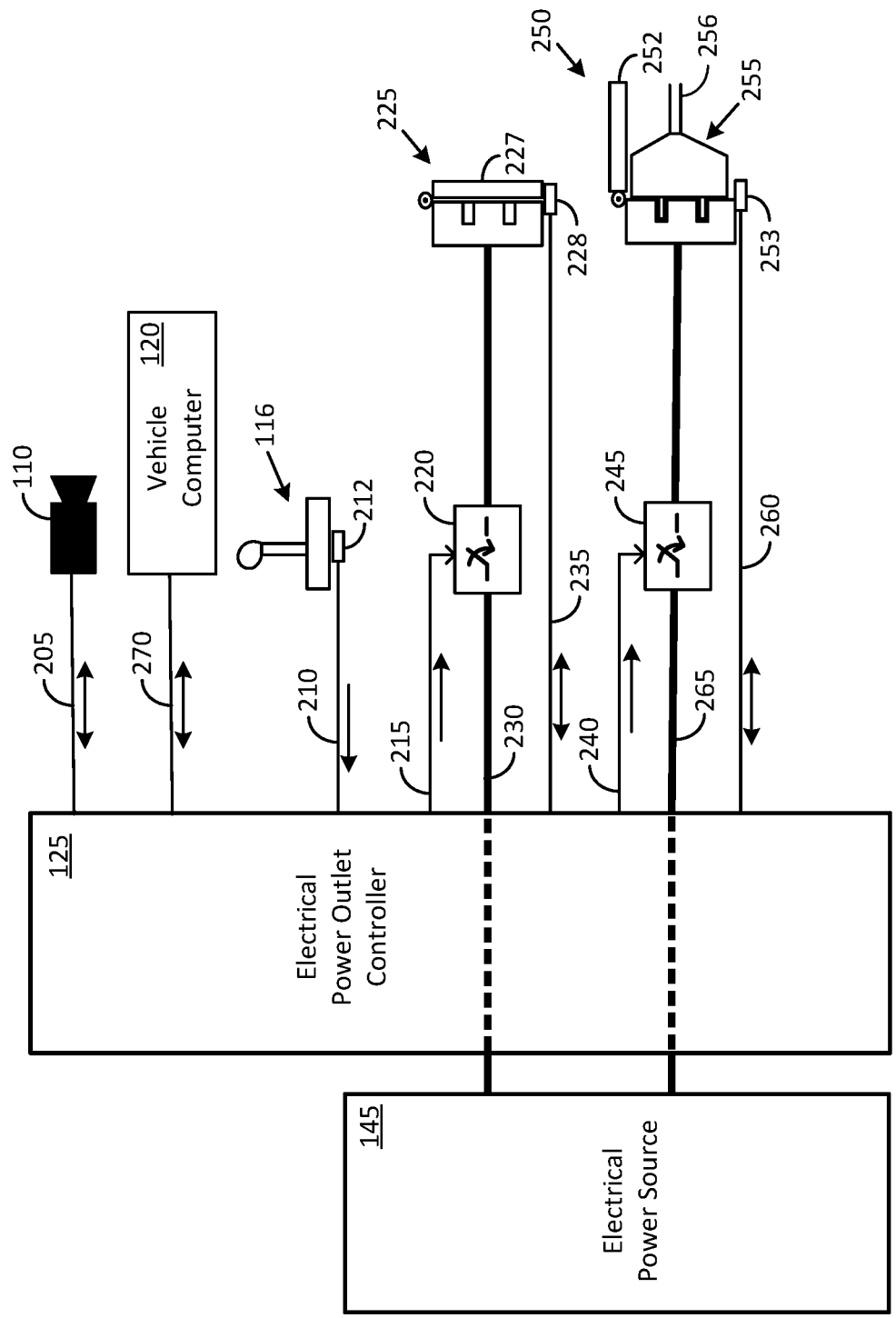
FIG. 2 illustrates an example configuration that may be associated with an electrical power outlet controller system in accordance with an embodiment of the disclosure.

FIG. 2 illustrates an example configuration that may be associated with the electrical power outlet controller system 125 in accordance with an embodiment of the disclosure. In this example configuration, the electrical power outlet controller system 125 is shown controlling power provided to two example electrical power outlets—an electrical power outlet 225 and an electrical power outlet 250. However, it must be understood that the description provided herein is equally applicable to configurations where the electrical power outlet controller system 125 controls power provided to a single electrical power outlet or to more than two electrical power outlets. The electrical power outlets can be of various types such as, for example, the various electrical power outlets described above with reference to FIG. 1.

Electrical power is provided to the two example electrical power outlets by the electrical power source 145. As indicated above, the electrical power source 145 can include any of various types of components that can produce various types of voltages such as, for example, an AC power supply, a DC power supply, a DC-to-AC converter, and/or a battery. The various components may provide one or more voltages such as, for example, 5V DC, 12V DC, 110V AC, and 220V AC.

In the illustrated configuration, various other objects are coupled to the electrical power outlet controller system 125. The objects can include, for example, the camera 110, the vehicle computer 120, a sensor 212 coupled to the drive selector 116, a switch 220, a detector 228, a switch 245, and a detector 253. The camera 110 is coupled to the electrical power outlet controller system 125 via a bidirectional link 205 that can be implemented by use of any of various wired and/or wireless media such as, for example, a coaxial cable, an optical fiber, and/or a WiFi link. The bidirectional link 205 may be used to convey commands (such as, for example, an image capture command) from the electrical power outlet controller system 125 to the camera 110 and for conveying images in the opposite direction from the camera 110 to the electrical power outlet controller system 125.

The vehicle computer 120 is coupled to the electrical power outlet controller system 125 via a bidirectional link 270 that can be implemented by use of any of various wired and/or wireless media such as, for example, a coaxial cable, an optical fiber, and/or a WiFi link. The bidirectional link 270 may be used to convey requests (such as, for example, a request for engine operating information or vehicle movement status) from the electrical power outlet controller system 125 to the vehicle computer 120 and for conveying requested information in the opposite direction from the vehicle computer 120 to the electrical power outlet controller system 125.

The sensor 212 that is coupled to the drive selector 116 is configured to detect a position of a lever of the drive selector 116 ("L", "D", "N", "R', or "P" positions). The sensor 212 is coupled to the electrical power outlet controller system 125 via a link 210 that can be implemented by use of any of various wired and/or wireless media such as, for example, a coaxial cable, an optical fiber, and/or a WiFi link. The link 210 may be used to convey position information of the lever of the drive selector 116 to the electrical power outlet controller system 125.

The switch 220 can be any of various devices such as, for example, a relay or a circuit breaker, and is configured to connect or disconnect electrical power carried on a power line 230 from the electrical power source 145 to the electrical power outlet 225. The electrical power outlet controller system 125 can disconnect power to the electrical power outlet 225 by sending a first switch control signal (via a link 215) to the switch 220 that places the switch 220 in an open position. The electrical power outlet controller system 125 can reconnect power to the electrical power outlet 225 by sending a second switch control signal to the switch 220 (via the link 215) that places the switch 220 in a closed position.

The detector 228 is coupled to the electrical power outlet 225 in a configuration that allows the detector 228 to produce a first detection signal when a cover 227 that is attached to the electrical power outlet 225 is in an open position. The electrical contacts of the electrical power outlet 225 are exposed when the cover 227 is in the open position. When exposed, the electrical contacts allow an electrical connector (not shown) to be mated with the electrical power outlet 225.

The detector 228 is coupled to the electrical power outlet controller system 125 via a link 235 that can be implemented by use of any of various wired and/or wireless media such as, for example, a coaxial cable, an optical fiber, and/or a WiFi link. The link 235 may be used to convey a status information of the cover 227 (closed or open) to the electrical power outlet controller system 125. The link 235 may also be used by the electrical power outlet controller system 125 to transmit a signal for retaining the cover 227 in a closed position (or in an open position). Retaining the cover 227 (and other such covers) in a closed position may be desirable particularly when the vehicle 105 is in motion. In some cases, the electrical power outlet controller system 125 may either close or open the cover 227 based on a time delay. The time delay may be set, for example, by the driver 115 or any other authorized individual (including the parent of a child 140 shown in FIG. 1).

In a first example operational scenario, the electrical power outlet controller system 125 obtains status information of the cover 227 from the detector 228. The cover 227 is in a closed condition in the illustrated example. At this time, the electrical power outlet controller system 125 may place the switch 220 in an open position so as to disconnect electrical power to the electrical power outlet 225.

In another example operational scenario, the electrical power outlet controller system 125 obtains status information of the cover 227 from a camera such as, for example, the camera 110 which may be configured to obtain an image of the electrical power outlet 225 and the cover 227. The electrical power outlet controller system 125 may evaluate the image and determine that the cover 227 is in a closed position. In this condition, the electrical power outlet controller system 125 may place the switch 220 in an open position so as to disconnect electrical power to the electrical power outlet 225.

In yet another example operational scenario, the electrical power outlet controller system 125 may include a current detecting device (not shown) that can identify a current flow in the power line 230. In the illustrated example, there is no current flow in the power line 230 because the electrical power outlet 225 is in an unused condition and the electrical power outlet controller system 125 may place the switch 220 in an open position.

The switch 245 may be similar to, or identical to the switch 220 described above, and is configured to disconnect electrical power provided from the electrical power source 145 and via the power line 265 to the electrical power outlet 250. The electrical power outlet controller system 125 can disconnect power to the electrical power outlet 250 by sending a first control signal to the switch 245 via a link 240 that places the switch 245 in an open position. The electrical power outlet controller system 125 can reconnect power to the electrical power outlet 250 by sending a second control signal via the link 240 to the switch 245 that places the switch 245 in a closed position.

The detector 253 is coupled to the electrical power outlet 250 in a configuration that allows the detector 253 to produce a first detection signal when a cover 252 that is attached to the electrical power outlet 250 is in an open position. The electrical contacts of the electrical power outlet 250 are exposed when the cover 252 is in the open position. When exposed, the electrical contacts allow an electrical connector 255 to be mated with the electrical power outlet 250.

The detector 253 is coupled to the electrical power outlet controller system 125 via a link 260 that can be implemented by use of any of various wired and/or wireless media such as, for example, a coaxial cable, an optical fiber, and/or a WiFi link. The link 260 may be used to convey a status information of the cover 252 (closed or open) to the electrical power outlet controller system 125.

In a first example operational scenario, the electrical power outlet controller system 125 obtains status information of the cover 252 from the detector 253, which in the illustrated example is in an open position. In this condition, the electrical power outlet controller system 125 may place the switch 220 in a closed position so as to provide electrical power to the electrical connector 255 that is mated with the electrical power outlet 250.

In another example operational scenario, the electrical power outlet controller system 125 obtains status information of the cover 252 from a camera such as, for example, the camera 110 which may be configured to obtain an image of the electrical power outlet 250 and the cover 252. The electrical power outlet controller system 125 may evaluate the image and determine that the cover 252 is in an open position and that no connector is mated to the electrical power outlet 250. At this time, the electrical power outlet controller system 125 may place the switch 220 in an open position so as to disconnect electrical power to the electrical power outlet 225. However, at another instant in time, the electrical power outlet controller system 125 may evaluate another image and determine that the electrical connector 255 is mated with the electrical power outlet 250. In this condition, the electrical power outlet controller system 125 places the switch 220 in a closed position so as to provide electrical power to the electrical connector 255.

In yet another example operational scenario, the electrical power outlet controller system 125 may include a current detecting device (not shown) that can identify a current flow in the power line 265. In the illustrated example, there may be current flow in the power line 230 because the electrical connector 255 is mated with the electrical power outlet 250 and a device may be drawing current via the electrical cord 256 that is coupled to the electrical connector 255.

In an example implementation, the electrical power outlet controller system 125 may place the switch 220 and/or the switch 245 in either an open or a closed position for a period of time irrespective of a movement state of the vehicle 105. An individual, such as, for example, the driver 115 of the vehicle 105 may provide authorization and/or a command to the electrical power outlet controller system 125 for placing the switch 220 and/or the switch 245 in either the open or the closed position. Thus, in an example scenario, an electrical power outlet can be forced to remain in a powered-up state even when the vehicle 105 is moving. The individual may provide the authorization and/or the command via the GUI of the infotainment system 117 or via the personal device 136, for example. In another example scenario, the electrical power outlet controller system 125 may operate one or more switches (e.g., opening or closing) based on determining an authorization status of the individual 135 and/or of the personal device 136. The authorization status may be provided to the electrical power outlet controller system 125 by the individual 135 (via the personal device 136, or the processing of a digital image from the camera 110 of the vehicle 105, for example) or by various other entities such as, for example, a parent of a child 140. In an example scenario, the parent may ensure that a child 140 is denied authorization in order to prevent access to all electrical power outlets in the vehicle 105 or at least some electrical power outlets in the vehicle 105 (such as, for example high-power electrical power outlets). For instance, if a child is determined to be within a predetermined distance of the vehicle, such as by detecting the presence to a personal device or by processing an image form a camera 110, and then causing the switches to open, thereby turning off one or more of the outlets.

In another example implementation, the electrical power outlet controller system 125 may assign a first amount of electrical power to a first electrical outlet and a different amount of electrical power to a second electrical outlet over a period of time. The assignment may be based, for example, on a priority scheme that is directed at allowing a greater current draw from a first electrical power outlet than a second electrical power outlet (current draw by the lawn mower 130 versus current draw by the personal device 136, for example).

The assignment may alternatively be based on a load shedding scheme such as, for example, to allow a greater current draw from a first electrical power outlet than a second electrical power outlet. A higher priority device may be coupled to the first electrical power outlet. The load shedding scheme may also be applied for addressing a start-up surge that may be momentarily imposed upon the first electrical power outlet.

In some cases, the electrical power outlet controller system 125 may execute an assignment procedure based on an electrical current consumption plan that may involve predicting an amount of power that may be drawn from one or more electrical power outlets. A look-up table may be used for this purpose. The look-up table may include information pertaining to various parameters such as for example, electrical current draw history and temperature parameters (ambient temperature, engine temperature, etc.).

In another example implementation, the electrical power outlet controller system 125 may disconnect power to one or more electrical connectors (such as, for example, all electrical connectors located outside the cabin of the vehicle 105) when the vehicle 105 does not meet certain criterion such as, for example, when the vehicle 105 is moving at a speed that equals or exceeds a threshold.

Conversely, the electrical power outlet controller system 125 may connect power to one or more electrical connectors (such as, for example, all electrical connectors located outside the cabin of the vehicle 105) when the vehicle 105 satisfies the speed criterion (i.e., is moving at a speed that is less than the threshold speed).

In another example implementation, the electrical power outlet controller system 125 may turn on (or turn off) power provided to an electrical power outlet based on detecting a hand gesture or a spoken command of an individual.

In another example implementation, the electrical power outlet controller system 125 may detect a connector that is not fully plugged into an electrical power outlet (using a resistance measurement procedure or a current measurement procedure, for example) and alert the operator of the condition. The alert may be issued via the infotainment system 117 or the personal device 136, for example.

In another example implementation, the electrical power outlet controller system 125 may provide a recommendation for the use of one or more electrical power outlets. The recommendation, which may be provided via the infotainment system 117 or the personal device 136, for example, can be based on evaluating factors such as, for example, current draw from one or more electrical power outlets. The electrical power outlet controller system 125 may also provide a recommendation to the driver 115 to carry out certain actions such as, for example, to unplug a connector plugged from an electrical power outlet or to drive below a threshold speed.

In another example implementation, the electrical power outlet controller system 125 may place all exterior electrical power outlets in an unpowered state under certain circumstances such as, for example, when no authorized individual is present in or around the vehicle 105, if no authorized device is present in the vehicle 105, and/or if no authorized device is present inside a perimeter area defined around the vehicle 105. One example of an authorized device is the personal device 136 shown in FIG. 1. The personal device 136 may be configured to perform certain operations related to the vehicle 105, such as, for example, starting the vehicle 105 from outside the vehicle 105 and/or maneuvering the vehicle 105 from outside the vehicle 105 (automatic parking, for example).

In another example implementation, one or more individuals may be authorized to use an electrical power outlet and/or an in-cabin electrical power outlet by an authorizing authority such as, for example, the driver 115 of the vehicle 105. In some applications, the electrical power outlet controller system 125 may track usage of an electrical power outlet by an individual for purposes of levying a charging fee.

In another example implementation, the electrical power outlet controller system 125 may use a detector (a current flow detector, for example) to detect a dummy plug inserted into an electrical power outlet. The dummy plug may be used for various reasons.

Figure 3:
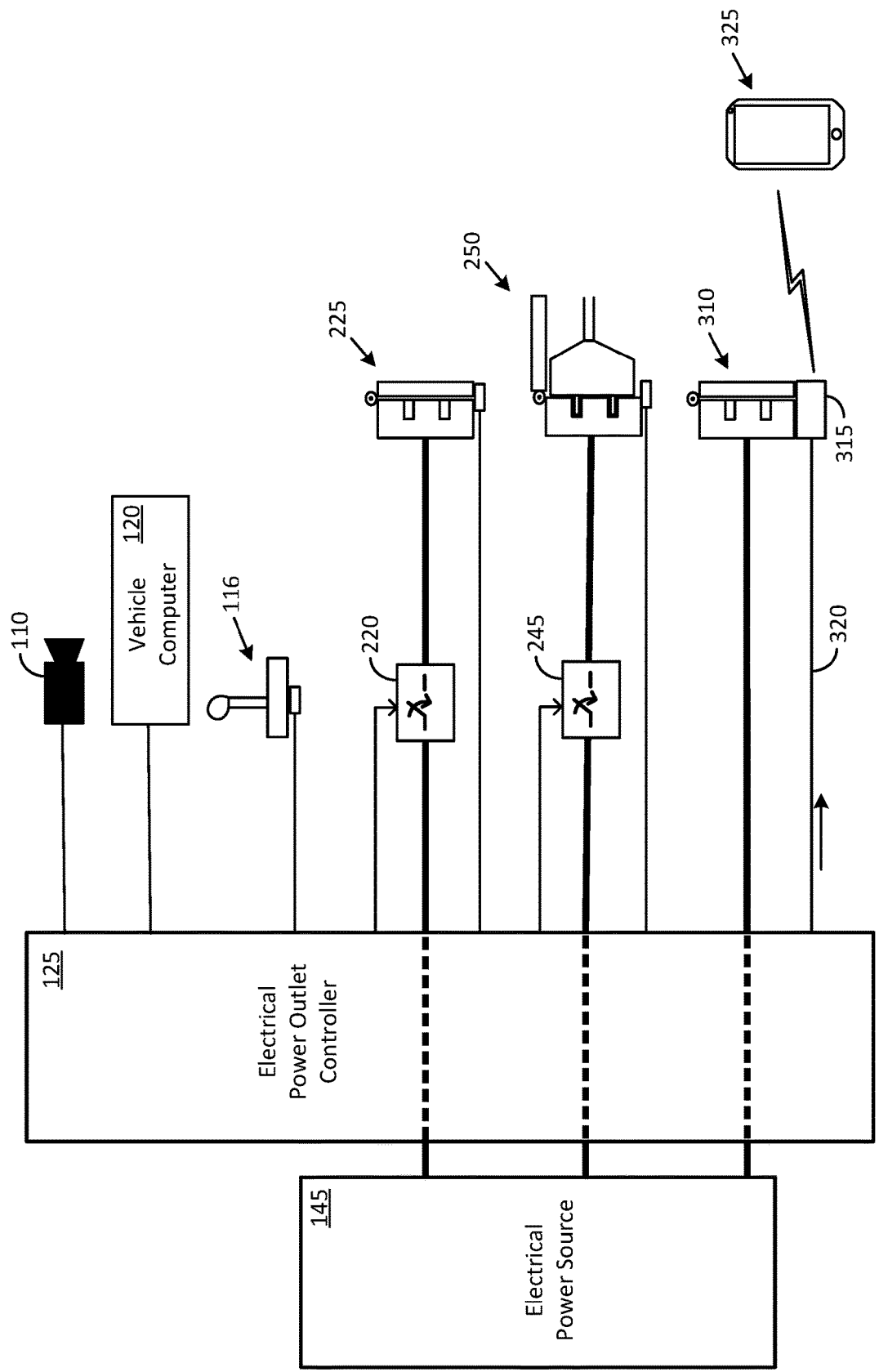
FIG. 3 illustrates another example configuration that may be associated with an electrical power outlet controller system in accordance with an embodiment of the disclosure.

FIG. 3 illustrates another example configuration that may be associated with the electrical power outlet controller system 125 in accordance with an embodiment of the disclosure. In this example configuration, the electrical power outlet controller system 125 is shown controlling power provided to three example electrical power outlets—an electrical power outlet 225, an electrical power outlet 250, and an electrical power outlet 310. Some aspects of the electrical power outlet 225 and the electrical power outlet 250 are described above. The electrical power outlet 310 may include a detector (not shown) such as the detector 228 described above, and can further include a communications interface 315.

The communications interface 315 is configured to provide communications between the electrical power outlet 310 and a wireless device 325 (such as, for example, the personal device 136 that is described above). Information can be exchanged between the communications interface 315 and the wireless device 325 by use of any of various communication media and communication formats such as, for example, Bluetooth®, cellular, WiFi, Zigbee®, or near-field-communications (NFC).

All or at least some of the information obtained by the communications interface 315 can be conveyed to the electrical power outlet controller system 125 via a link 320 that can be implemented by use of any of various wired and/or wireless media such as, for example, a coaxial cable, an optical fiber, and/or a WiFi link.

In an example scenario, the wireless device 325 may communicate with the electrical power outlet controller system 125 (via the communications interface 315) to negotiate use of the electrical power outlet 310 by a component such as, for example, the lawn mower 130 (shown in FIG. 1) and/or the portable refrigerator 150. The negotiations may involve, for example, assigning of an amount of power provided through the electrical power outlet 310, a fee for use of the electrical power outlet 310, charging times, charging procedures, charging guidance, and charging rules.

Figure 4:
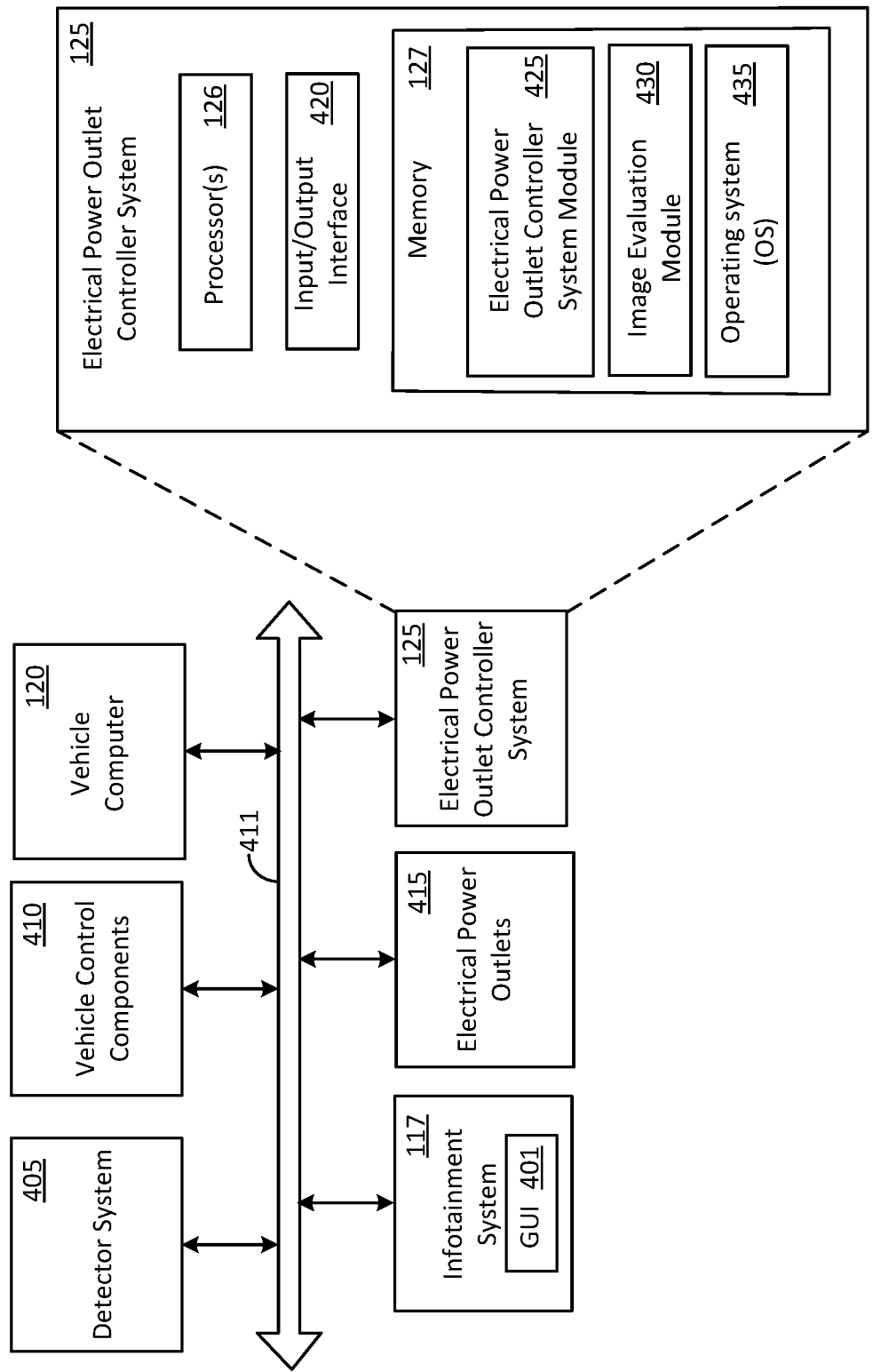
FIG. 4 shows some example components that can be included in a vehicle in accordance with an embodiment of the disclosure.

FIG. 4 shows some example components that can be included in the vehicle 105 in accordance with an embodiment of the disclosure. The example components can include a detector system 405, vehicle control components 410, the vehicle computer 120, the infotainment system 117, electrical power outlets 415, and the electrical power outlet controller system 125.

The various components are communicatively coupled to each other via one or more buses such as an example bus 411. The bus 411 may be implemented using various wired and/or wireless technologies. For example, the bus 411 can be a vehicle bus that uses a controller area network (CAN) bus protocol, a Media Oriented Systems Transport (MOST) bus protocol, and/or a CAN flexible data (CAN-FD) bus protocol. Some or all portions of the bus 411 may also be implemented using wireless technologies such as Bluetooth®, Bluetooth®, Ultra-Wideband, WiFi, Zigbee®, or near-field-communications (NFC).

The detector system 405 can include various types of detectors such as, for example, the camera 110 (shown in FIG. 1), the detector 228 (shown in FIG. 2), and the detector 253 (shown in FIG. 2). The signals conveyed by the various detectors of the detector system 405 to the electrical power outlet controller system 125 can vary in accordance with the type of detector. For example, the camera 110 can provide an image of the individual 135 (for example) in one of various formats (jpeg, mpeg, etc.), and the detector 228 can provide a digital signal indicating the cover of the electrical power outlet 225 in either a closed position or an open position.

The vehicle control components 410 can include various components and systems associated with driving-related functions of the vehicle 105 as well as with functions that are associated with the electrical power outlet controller system 125. Some example driving-related functions can include the operation of various vehicle components (engine, brakes, accelerator, fuel injection, etc.), and actions such as collision avoidance, automatic braking, and cruise control. The vehicle control components 410 may be controlled, activated, and/or operated by the vehicle computer 120. In some cases, some of the vehicle control components 410 may be controlled, activated, and/or operated by the electrical power outlet controller system 125. For example, the electrical power outlet controller system 125 may utilize some of the vehicle control components 410 to detect a speed of travel of the vehicle 105 and/or to control a speed of travel of the vehicle 105.

The infotainment system 117 can include a display system having a GUI 401 for carrying out various operations. The GUI may be used, for example, by the driver 115 of the vehicle 105 to interact with the electrical power outlet controller system 125, for obtaining information about various electrical power outlets in the vehicle 105, and/or for managing the operations of various electrical power outlets in the vehicle 105.

The electrical power outlets 415 can include the various example electrical power outlets described above.

The electrical power outlet controller system 125 can be implemented in various ways. In one example implementation, the electrical power outlet controller system 125 can be an independent device (enclosed in an enclosure, for example). In another example implementation, some or all components of the electrical power outlet controller system 125 can be housed, merged, or can share functionality, with the vehicle computer 120. For example, an integrated unit that combines the functionality of the electrical power outlet controller system 125 with that of the vehicle computer 120 can be operated by a single processor and a single memory device. In the illustrated example configuration, the electrical power outlet controller system 125 includes the processor 126, an input/output interface 420, and a memory 127.

The input/output interface 420 is configured to provide communications between the electrical power outlet controller system 125 and other components coupled to the bus 411, for example.

The memory 127, which is one example of a non-transitory computer-readable medium, may be used to store an operating system (OS) 435, an image evaluation module 430, and various code modules such as, for example, an electrical power outlet controller module 425. The code modules are provided in the form of computer-executable instructions that can be executed by the processor 126 for performing various operations in accordance with the disclosure.

The electrical power outlet controller module 425 may be executed by the processor 126 for performing various operations in accordance with the disclosure. Some example operations are described above.

The electrical power outlet controller module 425 may cooperate with the image evaluation module 430 for evaluating images captured by the camera 110.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, by a processor, a transitioning of a vehicle to a drive mode; and
   disconnecting, by the processor, based on the transitioning, electrical power supplied to a first electrical power outlet in the vehicle.

2. The method of claim 1, wherein the transitioning of the vehicle to the drive mode comprises a first transition of a drive selector to a drive position, and wherein the method further comprises:
   detecting, by the processor, the vehicle in motion; and
   disconnecting, by the processor, based on detecting the vehicle in motion, electrical power supplied to a second electrical power outlet in the vehicle.

3. The method of claim 2, wherein at least one of the first electrical power outlet or the second electrical power outlet is accessible from outside the vehicle.

4. The method of claim 1, further comprising:
   detecting, by the processor, an electrical plug plugged in a second electrical power outlet in the vehicle; and
   placing, by the processor, based on detecting the electrical plug plugged in the second electrical power outlet, the vehicle in one of a stopped condition or limiting a speed of travel of the vehicle to a threshold speed.

5. The method of claim 4, wherein the second electrical power outlet is located in one of a bumper, a grille, a tailgate, a roof, a chassis, or a body panel of the vehicle.

6. The method of claim 1, further comprising:
   detecting, by the processor, a first electrical plug plugged in the first electrical power outlet;
   receiving, by the processor, an authorization to override the disconnecting of the electric power supplied to the first electrical power outlet and reconnect electrical power supplied to the first electrical power outlet in the vehicle; and
   reconnecting, by the processor, based on receiving the authorization, electrical power to the first electrical power outlet in the vehicle.

7. The method of claim 1, wherein the transitioning of the vehicle to the drive mode comprises a first transition of a drive selector from a park position to a drive position, and wherein the method further comprises:
   detecting, by the processor, a second transition of the drive selector of the vehicle from the drive position to the park position;
   detecting, by the processor, a cover of the first electrical power outlet in one of a closed position or an open position;
   inhibiting, by the processor, based on detecting the second transition and detecting the cover of the first electrical power outlet in the closed position, a reconnection of electrical power to the first electrical power outlet in the vehicle; and
   reconnecting, by the processor, based on detecting the second transition and detecting the cover of the first electrical power outlet in the open position, electrical power to the first electrical power outlet in the vehicle.

8. The method of claim 1, further comprising:
   detecting, by the processor, at least one of an individual or a personal device located inside a perimeter area defined around the vehicle;
   determining, by the processor, at least one of an identity of the individual or an authorization status of the individual; and
   connecting electrical power to the first electrical power outlet based on the at least one of the identity of the individual or the authorization status of the individual.

9. A method comprising:
   determining, by a processor, a first speed of travel of a vehicle;
   determining, by the processor, that the first speed of travel of the vehicle fails to satisfy a speed criterion; and
   disconnecting, by the processor, electrical power supplied to a first electrical power outlet in the vehicle.

10. The method of claim 9, wherein determining that the first speed of travel of the vehicle fails to satisfy the speed criterion comprises comparing the first speed of travel of the vehicle to a threshold speed, and wherein the method further comprises:
    determining a second speed of travel of the vehicle;
    determining, by the processor, that the second speed of travel satisfies the speed criterion; and
    connecting, by the processor, electrical power to the first electrical power outlet in the vehicle.

11. The method of claim 10, further comprising:
    detecting, by the processor, a stopped condition of the vehicle; and
    connecting, by the processor, electrical power to the first electrical power outlet in the vehicle.

12. The method of claim 11, further comprising:
    detecting, by the processor, a transitioning of the vehicle to a drive mode; and
    disconnecting, by the processor, electrical power to a second electrical power outlet in the vehicle.

13. The method of claim 12, wherein at least one of the first electrical power outlet or the second electrical power outlet is accessible from outside the vehicle.

14. The method of claim 9, further comprising:
    detecting, by the processor, an electrical plug plugged into a second electrical power outlet in the vehicle; and
    placing, by the processor, based on detecting the electrical plug plugged into the second electrical power outlet, the vehicle in one of a stopped condition or a limited speed of travel.

15. A vehicle comprising:
    a vehicle computer; and
    an electrical power outlet controller comprising:
    a memory that stores computer-executable instructions; and
    a processor configured to access the memory and execute the computer-executable instructions to perform operations comprising:

detecting a transitioning of the vehicle to a drive mode; and disconnecting, based on the transitioning, electrical power supplied to a first electrical power outlet in the vehicle.

16. The vehicle of claim 15, wherein the transitioning of the vehicle to the drive mode comprises a first transition of a drive selector from a park position to a drive position, and wherein the processor is further configured to access the memory and execute the computer-executable instructions to perform operations comprising:

detecting the vehicle in motion; and disconnecting, based on detecting the vehicle in motion, electrical power supplied to a second electrical power outlet in the vehicle.

17. The vehicle of claim 16, wherein at least one of the first electrical power outlet or the second electrical power outlet is accessible from outside the vehicle.

18. The vehicle of claim 15, wherein the processor is further configured to access the memory and execute the computer-executable instructions to perform operations comprising:

detecting an electrical plug plugged in a second electrical power outlet in the vehicle; and placing, based on detecting the electrical plug plugged in the second electrical power outlet, the vehicle in one of a stopped condition or limiting a speed of travel of the vehicle to a threshold speed.

19. The vehicle of claim 18, wherein the second electrical power outlet is located in one of a bumper, a grille, a tailgate, a roof, a chassis, or a body panel of the vehicle.

20. The vehicle of claim 15, wherein the processor is further configured to access the memory and execute the computer-executable instructions to perform operations comprising:

detecting a first electrical plug plugged in the first electrical power outlet;

receiving an authorization to override the disconnecting of the electric power supplied to the first electrical power outlet and reconnect electrical power supplied to the first electrical power outlet in the vehicle; and reconnecting, based on receiving the authorization, electrical power to the first electrical power outlet in the vehicle.

\* \* \* \* \*